(12) United States Patent
Ishii et al.

(10) Patent No.: US 6,342,550 B1
(45) Date of Patent: Jan. 29, 2002

(54) FLAME-RETARDENT POLYCARBONATE RESIN COMPOSITION AND A MOLDED PRODUCT USING THE SAME

(75) Inventors: Kazuhiko Ishii; Ken Shimomai, both of Kanagawa (JP)

(73) Assignee: Mitsubishi Engineering Plastics Corporation, Tokyo (JP)

( * ) Notice: Subject to any disclaimer, the term of this patent is extended or adjusted under 35 U.S.C. 154(b) by 0 days.

(21) Appl. No.: 09/440,131

(22) Filed: Nov. 15, 1999

(30) Foreign Application Priority Data

Feb. 3, 1999 (JP) ............................. 11-026042

(51) Int. Cl.$^7$ .................... C08K 51/42; C08K 5/02; C08L 51/06
(52) U.S. Cl. .................. 524/161; 524/166; 524/463; 524/504
(58) Field of Search ................ 524/161, 166, 524/463, 504

(56) References Cited

U.S. PATENT DOCUMENTS

| 3,775,367 | A | * | 11/1973 | Nouvertne |
| 4,649,168 | A |  | 3/1987 | Kress et al. |
| 5,061,745 | A |  | 10/1991 | Wittmann et al. |
| 5,087,524 | A | * | 2/1992 | Krishnan et al. |
| 5,981,661 | A | * | 11/1999 | Liao et al. |
| 6,005,025 | A | * | 12/1999 | Bhatia et al. |

FOREIGN PATENT DOCUMENTS

| GB | 1 516 544 | 8/1974 |
| JP | 61-9982 | 3/1986 |

* cited by examiner

Primary Examiner—Tae H. Yoon
(74) Attorney, Agent, or Firm—Sughrue, Mion, Zinn, Macpeak & Seas, PLLC

(57) ABSTRACT

The purpose of the present invention is to provide a flame-retardant polycarbonate resin composition which contains phosphorus-free flame-retardant(s), has an excellent impact resistance, an excellent heat resistance as well as an excellent moldability, and can satisfy a severe flammability level. According to the present invention, there is provided a flame-retardant polycarbonate resin composition which comprises (A) 100 parts by weight of an aromatic polycarbonate resin, (B) 0.01–5 parts by weight of an organic sulfonic acid metal salt, (C) 0.01–5 parts by weight of a fluorinated polyolefin, (D) 0.2–20 parts by weight of a diene-containing multi-layered polymer, and wherein the content of a phosphorus-containing flame-retardant is less than 0.5 parts by weight.

17 Claims, No Drawings

FLAME-RETARDANT POLYCARBONATE RESIN COMPOSITION AND A MOLDED PRODUCT USING THE SAME

FIELD OF THE INVENTION

The present invention relates to a flame-retardant polycarbonate resin composition, more particularly to a flame-retardant polycarbonate resin composition which contains only a small amount or none of a phosphorus-containing flame-retardant, but has an excellent flame resistance.

BACKGROUND OF THE INVENTION

Polycarbonate resins are widely used in automobile industry, office automation instrument industry, electric/electronic industry and the like. Flame-retardant resin materials are eagerly required for office automation instruments, home electric appliances, and other products. In order to answer the requirement, many kinds of flame-retardants are being developed. For flame-retardants for polycarbonate resins, brominated compounds are usually used singly or together with antimony trioxide. These resin compositions have, however, such a problem that they can cause an environmental pollution because of generation of bromine-containing gases when burnt.

Recently in order to reduce the amount of using those brominated compounds considering the above-mentioned problem, polycarbonate resin compositions containing, for example, phosphorus-containing flame-retardants such as phosphate esters have been reported. These compositions, however, have such faults that impact and heat resistances are low. In addition, the above-mentioned environmental pollution problem is not solved completely by those compositions. Phosphorus-free flame-retardant materials include a flame-retardant polycarbonate resin composition prepared by adding an organic alkaline metal salt or an organic alkaline earth metal salt and polytetrafluoroethylene to an aromatic polycarbonate (see Japanese Patent Laid-Open Publication No. 51-45159). It was difficult, however, to obtain a resin material which has excellent heat and impact resistances, and satisfies a severe UL flame resistance level of V-0 in a molded product, having a thickness of 1 mm or thinner, which is required for thin wall molding.

SUMMARY OF THE INVENTION

The object of the present invention is to provide a flame-retardant polycarbonate resin composition containing a small amount or none of a phosphorus-containing flame-retardant, which is safe to the environment, whose properties are not deteriorated by decomposition of a phosphorus-containing flame-retardant when use, and which has excellent impact and heat resistances as well as an excellent moldability, and can satisfy the flame resistance level as high as a conventional composition containing a phosphorus-containing flame-retardant.

The present inventors carried out zealous research in order to achieve the above-mentioned object, and found that an excellent flame-retardant polycarbonate resin composition having desired properties can be obtained by admixing a specific amount of each of an organic sulfonic acid metal salt, a fluorinated polyolefin and a diene-containing multi-layered polymer, to an aromatic polycarbonate resin. The present invention was completed on the basis of these findings.

According to the present invention, there is provided a flame-retardant polycarbonate resin composition which comprises (A) 100 parts by weight of an aromatic polycarbonate resin, (B) 0.01–5 parts by weight of an organic sulfonic acid metal salt, (C) 0.01–5 parts by weight of a fluorinated polyolefin, (D) 0.2–20 parts by weight of a diene-containing multi-layered polymer, and wherein the content of a phosphorus-containing flame-retardant is less than 0.5 parts by weight.

Preferably, the aromatic polycarbonate resin (A) is a polycarbonate resin derived from 2,2-bis(4-hydroxyphenyl)propane. Preferably, the aromatic polycarbonate resin (A) has a viscosity-average molecular weight of 15,000–30,000.

Preferably, the organic sulfonic acid metal salt (B) is a perfluoroalkane-sulfonic acid metal salt. Preferably, the metal of said organic sulfonic acid metal salt (B) is an alkaline metal or an alkaline earth metal.

Preferably, the fluorinated polyolefin (C) is polytetrafluoroethylene, and more preferably polytetrafluoroethylene having an ability of forming fibril.

Preferably, the diene-containing multi-layered polymer (D) has an inner layer consisting mainly of a diene-containing elastic polymer, and an outer layer consisting mainly of a polymer other than a diene-containing elastic polymer. Preferably, the outer layer of the multi-layered polymer consists mainly of a thermoplastic resin which improves adhesiveness or miscibility with an aromatic polycarbonate resin. More preferably, the polymer of the outer layer of a multi-layered polymer is a polymer obtained by polymerizing one or more monomers selected from a group consisting of aromatic vinyl monomers, vinyl cyanide monomers, methacrylate ester monomers, and acrylate ester monomers. Particularly preferably, the diene-containing multi-layered polymer (D) has an inner layer consisting mainly of an elastic polymer obtained by polymerizing monomers containing butadiene, and an outer layer consisting mainly of a polymer obtained by polymerizing monomers containing methyl methacrylate.

In a particularly preferred embodiment of the present invention, the aromatic polycarbonate resin (A) is a polycarbonate resin derived from 2,2-bis(4-hydroxyphenyl)propane, the organic sulfonic acid metal salt (B) is an alkaline metal salt or an alkaline earth metal salt of a perfluoroalkane-sulfonic acid, the fluorinated polyolefin (C) is a polytetrafluoroethylene, and the diene-containing multi-layered polymer (D) has a core layer consisting mainly of an elastic polymer obtained by polymerizing monomers containing butadiene, and an outer layer consisting mainly of a polymer obtained by polymerizing monomers containing methyl methacrylate.

In the present invention, the content of a phosphorus-containing flame-retardant is preferably 0.3 parts by weight or less, and more preferably 0.1 parts by weight or less per 100 parts by weight of an aromatic polycarbonate resin. Particularly preferably, the composition contains substantially no phosphorus-containing flame-retardant.

According to another aspect of the present invention, there is provided a molded product which is made of a flame-retardant polycarbonate resin composition which comprises (A) 100 parts by weight of an aromatic polycarbonate resin, (B) 0.01–5 parts by weight of an organic sulfonic acid metal salt, (C) 0.01–5 parts by weight of a fluorinated polyolefin, (D) 0.2–20 parts by weight of a diene-containing multi-layered polymer, and wherein the content of a phosphorus-containing flame-retardant is less than 0.5 parts by weight.

Preferably, the molded product of the present invention has an Izod impact strength of 392 J/m (40 kgf-cm/cm) or larger.

Preferably, the molded product of the present invention has a deflection temperature under load of 129° C. or higher.

DETAILED DESCRIPTION OF THE INVENTION

The present invention will be described in detail below. The values on both ends of symbol "–" in this specification mean a range from a lower limit to an upper limit, wherein the range includes both values.

The flame-retardant polycarbonate resin composition of the present invention comprises (A) 100 parts by weight of an aromatic polycarbonate resin, (B) 0.01–5 parts by weight of an organic sulfonic acid metal salt, (C) 0.01–5 parts by weight of a fluorinated polyolefin, (D) 0.2–20 parts by weight of a diene-containing multi-layered polymer, and the content of a phosphorus-containing flame-retardant is less than 0.5 parts by weight.

The aromatic polycarbonate resin used for the present invention includes a homopolymer or copolymer of an optionally blanched thermoplastic aromatic polycarbonate which is prepared by reacting an aromatic hydroxyl compound or a mixture of an aromatic hydroxyl compound and a small amount of polyhydroxyl compound with a phosgene or carbonate diester. The polymerization for preparing the aromatic polycarbonate resin includes "interfacial polycondensation (phosgenation method)" and "fusion cook method (ester exchange process)".

The aromatic hydroxyl compound used for the present invention includes 2,2-bis(4-hydroxyphenyl)propane (=Bisphenol A), Tetramethyl Bisphenol A, bis(4-hydroxyphenyl)-p-diisopropylbenzene, hydroquinone, resorcinol, and 4,4-dihydroxydiphenyl, and preferably Bisphenol A.

A branched aromatic polycarbonate resin can be obtained by using a polyhydroxyl compound such as phloroglucinol, 4,6-dimethyl -2,4,6-tri(4-hydroxyphenyl)-2-heptene, 4,6-dimethyl-2,4,6-tri(4-hydroxyphenyl)heptane, 2,6-dimethyl-2,4,6-tri(4-hydroxyphenyl)-3-heptene, 1,3,5-tri(4-hydroxyphenyl)benzene, and 1,1,1-tri(4-hydroxyphenyl) ethane, or 3,3-bis(4-hydroxyaryl)oxyindole (=isatinbisphenol), 5-chloroisatinbisphenol, 5,7-dichloroisatinbisphenol, or 5- bromoisatinbisphenol together with the aromatic hydroxyl compound at 0.01–10 mol. %, preferably at 0.1–2 mol. %, per total amount of the aromatic hydroxyl compound and the polyhydroxyl compound.

In order to regulate a molecular weight of the aromatic polycarbonate resin for the present invention is used an aromatic mono-hydroxyl compound such as m- or p-methylphenol, m- or p-propylphenol, p-tert-butylphenol, and a p-long chain alkyl-substituted phenol.

For the aromatic polycarbonate resin for the present invention are used preferably a polycarbonate resin derived from 2,2-bis(4-hydroxyphenyl)propane, and a polycarbonate copolymer derived from 2,2-bis(4-hydroxyphenyl) propane and other aromatic dihydroxyl compound(s). The resin can be a polymer having a siloxane structure, e.g. a polycarbonate resin obtained by copolymerizing with an oligomer having a siloxane structure, in order to enhance flammability. The aromatic polycarbonate resin for the present invention may be a mixture of two or more resins.

The aromatic polycarbonate resin for the present invention has a viscosity-average molecular weight, preferably, of 15,000–30,000, more preferably, of 16,000–28,000, as calculated from a viscosity measured at 25° C. using methylene chloride as a solvent.

For the organic sulfonic acid metal salt for the present invention are used preferably an aliphatic sulfonic acid metal salt and an aromatic sulfonic acid metal salt. The metal of the organic sulfonic acid metal salt includes an alkaline metal and an alkaline earth metal. The alkaline metal and the alkaline earth metal include sodium, lithium, potassium, rubidium, cesium, beryllium, magnesium, calcium, strontium, barium, and the like. The organic sulfonic acid metal salt may be used as a mixture of two or more salts. These organic sulfonic acid metal salts are considered to generate an incombustible gas (carbon dioxide) and, at the same time, to promote the formation of a carbonized layer by decomposition and gellation when the aromatic polycarbonate resin is burnt. This hypothesis is presented here for better understanding of the present invention, not to limit the scope of the present invention.

The aliphatic sulfonic acid metal salt for the present invention is preferably a perfluoroalkanesulfonic acid metal salt. The perfluoroalkanesulfonic acid metal salt is preferably an alkaline metal salt or an alkaline earth metal salt of a perfluoroalkanesulfonic acid, more preferably a sulfonic acid alkaline metal salt having a C4–C8 perfluoroalkyl group, a sulfonic acid alkaline earth metal salt having a C4–C8 perfluoroalkyl group and the like.

The perfluoroalkanesulfonic acid metal salt includes sodium perfluorobutanesulfonate, potassium perfluorobutanesulfonate, sodium perfluoromethylbutanesulfonate, potassium perfluoromethylbutanesulfonate, sodium perfluorooctanesulfonate, potassium perfluorooctanesulfonate, and tetraethylammonium perfluorobutanesulfonate.

For the aromatic sulfonic acid metal salt are used preferably an aromatic sulfonic acid alkaline metal salt, an aromatic sulfonic acid alkaline earth metal salt, an aromatic sulfonesulfonic acid alkaline metal salt, an aromatic sulfonesulfonic acid alkaline earth metal salt, and the like. The aromatic sulfonesulfonic acid alkaline metal salt and the aromatic sulfonesulfonic acid alkaline earth metal salt can be polymers.

The aromatic sulfonic acid metal salt includes sodium 3,4-dichlorobenzenesulfonate, sodium 2,4,5-trichlorobenzenesulfonate, sodium benzenesulfonate, sodium diphenylsulfone-3-sulfonate, potassium diphenylsulfone-3-sulfonate, sodium 4,4'-dibromodiphenylsulfone-3-sulfonate, potassium 4,4'-dibromodiphenylsulfone-3-sulfonate, calcium 4-chloro-4'-nitrodiphenylsulfone-3-sulfonate, disodium diphenylsulfone-3,3'-disulfonate, dipotassium diphenylsulfone-3,3'-disulfonate, and the like.

The content of an organic sulfonic acid metal salt is 0.01–5 parts by weight per 100 parts by weight of an aromatic polycarbonate resin. If the content of an organic sulfonic acid metal is less than 0.01 parts by weight, flame resistance tends to be lost. If the content of an organic sulfonic acid metal salt is more than 5 parts by weight, heat stability of the obtained composition tends to be lowered. The content of an organic sulfonic acid metal salt is preferably 0.02–3 parts by weight, more preferably 0.03–2 parts by weight, per 100 parts by weight of an aromatic polycarbonate resin.

For the fluorinated polyolefin for the present invention is used a polymer in which all or almost all of hydrogen atoms of a polyolefin are substituted with fluorine atoms, such as polytetrafluoroethylene, and a copolymer consisting of tetrafluoroethylene and hexafluoropropylene, preferably, polytetrafluoroethylene.

For the polytetrafluoroethylene for the present invention is used, for example, polytetrafluoroethylene having a fibril-forming ability, that is, the polytetrafluoroethylene which has a tendency to bind polymers each other to form a fibroid structure. Preferably the polytetrafluoroethylene having a fibril-forming ability is easily dispersed in a polymer. The polytetrafluoroethylene having a fibril-forming ability is classified as type 3 in the ASTM standard, and prevents dropping when burned. The polytetrafluoroethylene having a fibril-forming ability includes commercially available "Teflon 6J", "Teflon 30J" (both Mitsui-DuPont Fluoro-chemical Co., Ltd.), and "Polyflon" (Daikin Chem. Ind. Co., Ltd.). ("Teflon" and "Polyflon" are trade names respectively.)

The content of a fluorinated polyolefin is 0.01–5 parts by weight per 100 parts by weight of an aromatic polycarbonate resin. If the content of a fluorinated polyolefin is less than 0.01 parts by weight, the obtained composition tends to have a low dropping-preventing effect and an insufficient flame resistance. If the content of a fluorinated polyolefin is more than 5 parts by weight, the obtained composition tends to have a poor extruding and molding properties. The content of a fluorinated polyolefin is preferably 0.02–3 parts by weight, more preferably 0.05–2 parts by weight per 100 parts by weight of an aromatic polycarbonate resin.

For the diene-containing multi-layered polymer for the present invention is used a polymer produced by serial multi-step seed polymerization in which a polymer produced in the preceding step is serially coated with a polymer in the following step, preferably by the emulsion polymerization. The diene-containing multi-layered polymer is preferably a multi-layered polymer having a core layer (=inner nuclear) consisting of a diene-containing elastic polymer and an outer layer (=shell) consisting of a polymer other than a diene-containing elastic polymer. The polymer structure can be a multi-layered polymer having an intermediate layer between a core layer and an outer layer, or a multi-layered polymer in which composition changes gradually between the core layer and the outer polymer surface.

The weight ratio of core:shell is not limited so long as the shell can cover the core completely, but it is usually within the range of 50:50 to 90:10. A diene-containing multi-layered polymer can also be used which has a core layer consisting of 1) an inner layer which serves as a core consisting of an aromatic vinyl polymer such as a polymer containing styrene in the center of the core layer, and 2) an intermediate layer consisting of a diene-containing elastic polymer outside the core layer.

The diene-containing elastic polymer is an elastic polymer which has a low glass-transition temperature (usually lower than room temperature, preferably 0° C. or lower, more preferably −30° C. or lower) and which may be chemically or physically crosslinked. The diene-containing elastic polymer includes a polymer obtained by polymerizing a diene monomer, and a elastic polymer which is obtained by copolymerizing a diene monomer and one or more vinyl monomers. For the diene monomer are used butadiene, isoprene, chloroprene and the like, preferably butadiene. The vinyl monomer includes aromatic vinyl monomers, vinyl cyanide monomers, methacrylate ester monomers, acrylate ester monomers and the like. The content of vinyl monomer used per the whole monomers when the diene-containing elastic polymer is polymerized, is usually 50% by weight or lower, preferably 30% by weight or lower.

The diene-containing elastic polymer for the multi-layered polymer for the present invention is preferably crosslinked. The crosslinked diene-containing elastic polymer can be produced by using a crosslinking monomer which has two or more polymerizable ethylenic unsaturated bonds in the molecule, such as divinylbenzene, butylene glycol diacrylate, and hexanediol diacrylate, when polymerizing a diene monomer alone or polymerizing a diene monomer and a monomer for copolymer component in combination. The crosslinking monomer is used usually at 0.01–5 % by weight, preferably at 0.1–2 % by weight per whole amount of monomers for the polymerization. A grafting monomer, which has two or more ethylenic unsaturated bonds which have different reactivities in the molecule, such as allyl methacrylate, can also be used. The grafting monomer is used usually at 5% by weight or lower, preferably at 0.1–2 % by weight per the whole amount of monomers used for the polymerization.

Usually a polymer other than a diene-containing elastic polymer, preferably a thermoplastic resin which improves adhesiveness or misibility to an aromatic polycarbonate resin which is a matrix of the resin composition in the present invention, is used for the polymer which forms the outer layer. The polymer for the outer layer is preferably a polymer obtained by polymerizing one or more monomers selected from a group consisting of aromatic vinyl monomers, vinyl cyanide monomers, methacrylate ester monomers, and acrylate ester monomers. A small amount of a diene monomer can be contained in the polymer which forms the outer layer.

The aromatic vinyl monomer includes styrene, p-methylstyrene and the like. The vinyl cyanide monomer includes acrylonitrile, methacrylonitrile and the like. The methacrylate ester monomer includes methyl methacrylate and the like. The acrylate ester monomer includes methyl acrylate, ethyl acrylate and the like.

Other monomers which can copolymerize with these aromatic vinyl monomers can be used in combination. In that case, the amount of the other monomers is preferably 50% by weight or lower, more preferably 30% by weight or lower, per the whole amount of monomers for copolymerization.

The outer layer may be crosslinked by a crosslinking monomer as in the case of the core layer.

For the diene-containing multi-layered polymer of this invention is used preferably a multi-layered polymer having a core layer consisting of an elastic polymer obtained by polymerizing monomer(s) containing butadiene and an outer layer consisting of a polymer obtained by polymerizing monomer(s) containing methyl methacrylate.

It was found in the present invention that, by admixing a diene-containing multi-layered polymer together with an organic sulfonic acid metal salt and a fluorinated polyolefin to a polycarbonate resin, an enough flame resistance can be obtained even though only a small amount or none of a phosphorus-containing flame-retardant is used. The flame resistance is considered to be generated by the following mechanism:

The diene-containing multi-layered polymer used in the present invention is granular, preferably globular. A particle size of the diene-containing multi-layered polymer is preferably 200nm-500nm.

The content of the diene-containing multi-layered polymer is 0.2–20 parts by weight per 100 parts by weight of an aromatic polycarbonate resin. If the content of the diene-containing multi-layered polymer is smaller than 0.2 parts by weight, improvement in impact strength and flame resistance tends to be diminished. If the content of the diene-containing multi-layered polymer is larger than 20 parts by weight, heat resistance and flame resistance tend to be lowered. The content of the diene-containing multi-layered polymer is preferably 0.3–15 parts by weight, more preferably 0.5–10 parts by weight.

The flame-retardant polycarbonate resin composition according to the present invention does not contain any phosphorus-containing flame-retardant, or contains less than 0.5 parts by weight of it per 100 parts by weight of an aromatic polycarbonate resin. It was found that the very low or no content of a phosphorus-containing flame-retardant enhances Izod impact strength and heat resistance, does not form any mold deposit, does not form silver streak-like defective appearance on the surface of a molded product, and does not lower flame resistance by moisture absorption. The content of a phosphorus-containing flame-retardant is preferably 0.3parts by weight or less, more preferably 0.2 parts by weight or less, still more preferably 0.1 parts by weight or less, most preferably substantially none, per 100 parts by weight of an aromatic polycarbonate resin. does not form any mold deposit, does not form silver streak-like defective appearance on the surface of a molded product, and does not lower flammability by moisture absorption. The content of a phosphorus-containing flame-retardant is preferably 0.3 parts by weight or less, more preferably 0.2 parts by weight or less, still more preferably 0.1 parts by weight or less, most preferably substantially none, per 100 parts by weight of an aromatic polycarbonate resin.

The phosphorus-containing flame-retardant includes, but not limited to, known phosphate ester flame-retardants such as phosphate esters (e.g., triphenyl phosphate and tricresyl phosphate) and condensed phosphate esters (e.g., phenyl resorcinol polyphosphate, cresyl resorcinol polyphosphate, and xylyl resorcinol polyphosphate).

The flame-retardant polycarbonate resin composition according to the present invention does not contain any bromine-containing flame-retardant, or contains less than 0.5 parts by weight of it per 100 parts by weight of an aromatic polycarbonate resin. If the content of the bromine-containing flame-retardant is 0.5 parts by weight or more, a remarkable amount of bromine-containing gases is generated, which can cause an environmental pollution, and can cause corrosion of molds in the molding machines. The content of the bromine-containing flame-retardant is preferably 0.3 parts by weight or less, more preferably 0.1 parts by weight or less, most preferably none, per 100 parts by weight of an aromatic polycarbonate resin. The bromine-containing flame-retardant includes decabromodiphenyl oxide, octabromodiphenyl oxide, hexabromocyclodecane and the like.

The flame-retardant polycarbonate resin composition according to the present invention can contain other additional component(s), if necessary, for example, to obtain a desired property, so long as the additional component does not impair its physical properties remarkably. The additional components include stabilizers (e.g., UV-light absorber and antioxidant), additives (e.g., pigment, dye, lubricant, other flame-retardant, mold release agent, and sliding property-improving agent), reinforcing agents (e.g., glass fiber, glass flake, and carbon fiber), and whiskers (e.g., potassium titanate and aluminum borate).

The flame-retardant polycarbonate resin composition according to the present invention can also contain a thermoplastic resin other than aromatic polycarbonate resins. The type and amount of the thermoplastic resin other than the aromatic polycarbonate resins can be determined depending on purposes, for example, to enhance physical properties such as moldability or chemical resistance. The thermoplastic resin other than the aromatic polycarbonate resin includes polyester resin, polyamide resin, polyolefin resin, polyphenylene ether-based resin, styrene-based resin, polysulfone, polyether sulfone, polyphenylene sulfide, polyacrylate, polyamide imide, polyether imide and the like.

The polyester resin includes polybutylene terephthalate, polyethylene terephthalate, polybutylene naphthalate, polyethylene naphthalate and the like. The polyolefin resin includes polyethylene, polypropylene and the like. The polyphenylene ether-based resin includes polyphenylene ether resin, a mixture of polyphenylene ether and polystyrene and/or HIPS and the like. The styrene-based resin includes polystyrene, HIPS, AS resin, ABS resin and the like.

For the thermoplastic resin other than the aromatic polycarbonate resin are preferably used polybutylene terephthalate, polyethylene terephthalate, polyphenylene ether-based resin, HIPS, ABS resin and the like. The content of the thermoplastic resin other than the aromatic polycarbonate resin is preferably less than 50% by weight, more preferably 40 % by weight or less, most preferably 30% by weight or less, of the sum of the aromatic polycarbonate resin and the thermoplastic resin other than the aromatic polycarbonate resin.

The flame-retardant polycarbonate resin composition according to the present invention can be produced, for example, by fusing and kneading an aromatic polycarbonate resin, an organic sulfonic acid metal salt, a diene-containing multi-layered polymer, a fluorinated polyolefin and the like, or by kneading an aromatic polycarbonate resin and a fluorinated polyolefin, followed by mixing an organic sulfonic acid metal salt and a diene-containing multi-layered polymer and fusing and kneading the mixture.

The flame-retardant polycarbonate resin composition according to the present invention can be molded into a molded product by various molding methods such as injection molding and extrusion molding. Heat stability of the resin composition according to the present invention during molding is much improved, compared with conventional bromine-containing flame-retardant-containing compositions and phosphate ester flame-retardant-containing compositions. The defective appearance and/or the deterioration in physical properties (e.g., "silver" streak and pearl luster) are/is suppressed even under severer molding conditions under which thinner products are produced. The flame-retardant polycarbonate resin composition according to the present invention is suitably used, for example, as parts for electronic information-processing equipment which is required to be light and small, such as battery case, for example, for portable telephone and personal computer.

A molded product made of the flame-retardant polycarbonate resin composition according to the present invention, has flame resistance which satisfies severe level V-0 even at a thickness of 0.8 mm, has excellent heat and impact resistances, and is useful for a thin molded product having parts with a thickness of 1 mm or thinner. An Izod impact strength of the molded product made of the flame-retardant polycarbonate resin composition according to the present invention, is preferably 392 j/m(40 kgf-cm/cm) or larger, more preferably 441 j/m (45 kgf-cm/cm) or larger, most preferably 490 j/m (50 kgf-cm/cm) or larger. A deflection temperature under load of a molded product made of the flame-retardant polycarbonate resin composition according to the present invention, is preferably 129° C. or higher, more preferably 130° C. or higher.

The present invention will now be described more in detail by the following examples which merely illustrate the present invention. It will be apparent to those skilled in the art that various modifications, variations and improvements can be made without departing from the spirit of the present invention. The scope of the present invention is not limited by the following examples.

EXAMPLES

The following materials were used in Examples and Comparative Examples:
1) Polycarbonate resin: poly-4,4-isopropylidenediphenylcarbonate, commercial name "Iupilon" (registered trade mark) H-3000, viscosity-average molecular weight 18,900, a product of Mitsubishi Engineering-Plastics Corp., Ltd. (abbreviated as "PC resin" hereafter).
2) Organic sulfonic acid metal salt #1: perfluorobutane-sulfonic acid potassium salt, commercial name "F-114", a product of Dainippon Ink And Chemicals, Incorporated Industry, Ltd.
3) organic sulfonic acid metal salt #2: diphenylsulfone-sulfonic acid potassium salt, commercial name "KSS", a product of UCB Japan, Ltd.
4) Phosphorus-containing flame-retardant #1: phosphate ester, TPP, a product of Daihachi Chem. Co., Ltd.
5) Polytetrafluoroethylene: commercial name "Polyflon F-201L", a product of Daikin Industries Co., Ltd. (abbreviated as "PTFE" hereafter).
6) Multi-layered polymer #1: a multi-layered polymer consisting of a core layer of polybutadiene, and an outer layer of methyl methacrylate/ethyl acrylate copolymer; commercial name "Paraloid EXL-2603", a product of Kureha Chemical Industry Co., Ltd.
7) Multi-layered polymer #2: a multi-layered polymer consisting of a core layer of butadiene/styrene copolymer, and an outer layer of poly(methyl methacrylate); commercial name "Metablen E-901", a product of Mitsubishi Rayon Co., Ltd.
8) Multi-layered polymer #3: a multi-layered polymer consisting of a core layer of a poly(alkyl acrylate), and an outer layer of poly(methyl methacrylate); commercial name "Paraloid EXL-2315", a product of Kureha Chemical Industry Co., Ltd.
9) Multi-layered polymer #4: a multi-layered polymer consisting of a core layer of a siloxane-containing poly(alkyl acrylate), and an outer layer of poly(methyl methacrylate); commercial name "Metablen SX-005", a product of Mitsubishi Rayon Co., Ltd.
10) Multi-layered polymer #5: a multi-layered polymer consisting of a core layer made of a siloxane-containing poly(alkyl acrylate), and an outer layer of styrene-acrylonitrile copolymer; commercial name "Metablen SRX-200", a product of Mitsubishi Rayon Co., Ltd.

Evaluation of physical properties of specimens were carried out according to the following methods:
11) Flame resistance: Vertical burning test was carried out using specimens having a thickness of 0.8 mm which satisfy the UL standard. "Total after flame time" is a sum of after flame times when five specimens are burned ten times. "The longest after flame time" is the longest after flame time among ten times of after flame. "Cotton ignition" is a (number of ignition/number of dripping) ratio. The number of dripping equals to a number of specimens dripped in the test. A result of the evaluation was determined according to Safety Standard UL-94 concerning burning test by Underwriters Laboratories Inc. "NG" means that a specimen does not satisfy the V-2 level.
12) Impact strength: 3.2-mm specimens for Izod impact test were prepared, and 0.25R notches were cut to evaluate.
13) Deflection temperature under load: A deflection temperature was determined under a load of 1.82 Mpa (18.5 kgf/cm$^2$) using a 6.4 -mm specimen for bending test.
14) Retention test: A resin was retained in a cylinder of a molding machine at 300° C. for 3 min when molding, and then specimens for Izod impact test and appearance evaluation were molded.
15) Appearance evaluation: Presence or absence of "silver streak" on the surface of a molded product after the retention test was determined. "silver streak" was not observed, ○; a small amount of "silver streak" was observed, Δ; a large amount of "silver streak" was observed, ×.
16) Air-conditioning test: Specimens for burning test were conditioned at a temperature of 23° C. and a humidity of 50% for 1 month, and then flame resistance was determined.
17) Humidification test: Specimens, for Izod impact test (3.2 mm) and test of tensile property, were conditioned at a temperature of 60° C. and a humidity of 90% for 500 hours, and then Izod impact strength and tensile elongation were determined. Retention of tensile elongation was calculated according to the following equation:

Retention of tensile elongation (%)=Elongation after humidification test (%)/Elongation before humidification test (%)×100

Example 1

100 parts by weight of aromatic polycarbonate resin, 0.1 parts by weight of organic sulfonic acid metal salt #1, 0.4 parts by weight of polytetrafluoroethylene, and 2 parts by weight of multi-layered polymer #1 were mixed with a tumbler for 15 mm. The resultant mixture was pelletized using a 30 mm twin screw extruder at a cylinder temperature of 280° C. The obtained pellets were molded to specimens having a thickness of 0.8 mm for burning test using an injection molding machine, to evaluate flame resistance. In addition, specimens for Izod impact test and bending test were molded at a cylinder temperature of 270° C. to carry out various evaluations. The results are summarized in Table 2.

Example 2

Pelletization was carried out in a similar manner to Example 1 except that multi-layered polymer #1 was replaced with multi-layered polymer #2, and evaluation was made similarly. The results are summarized in Table 1.

Example 3

Pelletization was carried out in a similar manner to Example 1 except that organic sulfonic acid metal salt #1 was replaced with organic sulfonic acid metal salt #2, and evaluation was made similarly. The results are summarized in Table 1.

Example 4

Pelletization was carried out in a similar manner to Example 1 except that the amount of organic sulfonic acid metal salt #1 was changed into 0.05 parts by weight, and evaluation was made similarly. The results are summarized in Table 1.

Example 5

Pelletization was carried out in a similar manner to Example except that the amount of multi-layered polymer #1 was changed to 5 parts by weight, and evaluation was made similarly. The results are summarized in Table 1.

TABLE 1

|  |  | Example 1 Example 6 | Example 2 | Example 3 | Example 4 | Example 5 | Example 7 |
|---|---|---|---|---|---|---|---|
| PC resin | (parts by weight) | 100 | 100 | 100 | 100 | 100 | 100 |
| Organic sulfonic acid metal salt #1 | (parts by weight) | 0.1 | 0.1 |  | 0.05 | 0.1 | 0.1 |
| Organic sulfonic acid metal salt #2 | (parts by weight) |  |  | 0.1 |  |  |  |
| PTFE | (parts by weight) | 0.4 | 0.4 | 0.4 | 0.4 | 0.4 | 0.4 |
| Multi-layered polymer #1 | (parts by weight) | 2 |  | 2 | 2 | 5 | 2 |
| Multi-layered polymer #2 | (parts by weight) |  | 2 |  |  |  |  |
| Phosphate ester | (parts by weight) |  |  |  |  |  | 0.3 |
| Deflection temperature under load | (° C.) | 132 | 131 | 131 | 132 | 130 | 130 |
| Izod impact strength | (kgf-cm/cm) | 64 | 61 | 62 | 64 | 68 | 64 |
|  | (j/m) | 628 | 598 | 608 | 628 | 667 | 628 |
| Total after flame time | (sec) | 16 | 31 | 39 | 24 | 41 | 16 |
| Longest after flame time | (sec) | 4 | 6 | 7 | 5 | 8 | 4 |
| Cotton ignition |  | 0/10 | 0/10 | 0/10 | 0/10 | 0/10 | 0/10 |
| UL class (thickness 0.8 mm) |  | V-0 | V-0 | V-0 | V-0 | V-0 | V-0 |

Comparative Example 1

Pelletization was carried out in a similar manner to Example 1 except that multi-layered polymer #1 was not used, and evaluation was made similarly. The results are summarized in Table 2.

Comparative Example 2

Pelletization was carried out in a similar manner to Example 1 except that multi-layered polymer #1 was replaced with multi-layered polymer #3, and evaluation was made similarly. The results are summarized in Table 2.

Comparative Example 5

Pelletization was carried out in a similar manner to Example 1 except that 0.5 parts by weight of phosphorus-containing flame-retardant #1 was admixed, and evaluation was made similarly. The results are summarized in Table 2.

Comparative Example 6

Pelletization was carried out in a similar manner to Example 1 except that 5 parts by weight of phosphorus-containing flame-retardant #1 was admixed, and evaluation was made similarly. The results are summarized in Table 2.

TABLE 2

|  |  | Comparative Example 1 | Comparative Example 2 | Comparative Example 3 | Comparative Example 4 | Comparative Example 5 | Comparative Example 6 |
|---|---|---|---|---|---|---|---|
| PC resin | (parts by weight) | 100 | 100 | 100 | 100 | 100 | 100 |
| Organic sulfonic acid metal salt #1 | (parts by weight) | 0.1 | 0.1 | 0.1 | 0.1 | 0.1 | 0.1 |
| Phosphorus-containing flame retardant #1 | (parts by weight) |  |  |  |  | 0.5 | 5 |
| PTFE | (parts by weight) | 0.4 | 0.4 | 0.4 | 0.4 | 0.4 | 0.4 |
| Multi-layered polymer #1 | (parts by weight) |  |  |  |  | 2 | 2 |
| Multi-layered polymer #3 | (parts by weight) |  | 2 |  |  |  |  |
| Multi-layered polymer #4 | (parts by weight) |  |  | 2 |  |  |  |
| Multi-layered polymer #5 | (parts by weight) |  |  |  | 2 |  |  |
| Deflection temperature under load | (° C.) | 133 | 131 | 131 | 131 | 128 | 112 |
| Izod impact strength | (kgf-cm/cm) | 12 | 61 | 18 | 39 | 38 | 9 |
|  | (j/m) | 118 | 598 | 177 | 382 | 373 | 88 |
| Total after flame time | (sec) | 51 | 65 | 180 | 205 | 16 | 14 |
| Longest after flame time | (sec) | 15 | 17 | 38 | 49 | 5 | 4 |
| Cotton ignition |  | 3/10 | 2/10 | 1/10 | 2/10 | 0/10 | 0/10 |
| UL class (thickness 0.8 mm) |  | V-2 | V-2 | NG | NG | V-0 | V-0 |

Comparative Example 3

Pelletization was carried out in a similar manner to Example 1 except that multi-layered polymer #1 was replaced with multi-layered polymer #4, and evaluation was made similarly. The results are summarized in Table 2.

Comparative Example 4

Pelletization was carried out in a similar manner to Example 1 except that multi-layered polymer #1 was replaced with multi-layered polymer #5, and evaluation was made similarly. The results are summarized in Table 2.

Example 6

Using pellets obtained in Example 1, retention test was carried out, and flame resistance after air-conditioning was evaluated. The results are summarized in Table 3.

Example 7

Pellets were prepared by adding 0.3 parts by weight of a phosphate ester to the composition of Example 1, and were evaluated in a similar manner as in Example 6. The results are summarized in Tables 3 and 4.

Comparative Example 7

Using pellets obtained in Comparative Example 5, retention test was carried out, and flame resistance after air-conditioning was evaluated as in the case of Example 6. The results are summarized in Tables 3 and 4.

Comparative Example 8

Using pellets obtained in Comparative Example 6, retention test was carried out, and flame resistance after air-conditioning was evaluated, as in the case of Example 6. The results are summarized in Tables 3 and 4.

TABLE 3

| | | Example 6 | Example 7 | Comparative Example 7 | Comparative Example 8 |
|---|---|---|---|---|---|
| Izod impact strength after retention test | (kgf-cm/cm) | 54 | 50 | 15 | 5 |
| | (J/m) | 530 | 490 | 147 | 49 |
| Appearance of molded product with respect to "silver-streak" | | ○ | Δ | Δ | x |
| Flammability after air-conditioning | | | | | |
| Total after flame time | (sec) | 17 | 16 | 52 | 90 |
| Longest after flame time | (sec) | 4 | 4 | 12 | 36 |
| Cotton ignition | | 0/10 | 0/10 | 0/10 | 1/10 |
| UL class (thickness 0.8 mm) | | V-0 | V-0 | V-1 | NG |

TABLE 4

| | Impact strength after humidification | | Retention of tensile |
|---|---|---|---|
| | (kgf-cm/cm) | (J/m) | elongation (%) |
| Example 6 | 57 | 559 | 97 |
| Example 7 | 52 | 510 | 95 |
| Comparative Example 7 | 25 | 245 | 80 |
| Comparative Example 8 | 5 | 49 | 50 |

The following were found from the results summarized in Tables 1–4:

1) As shown in Examples 1 and 2, the composition obtained by mixing 100 parts by weight of an aromatic carbonate resin, 0.1 parts by weight of organic sulfonic acid metal salt #1, 0.4 parts by weight of polytetrafluoroethylene, and 2 parts by weight of a diene-containing multi-layered polymer, satisfied the V-0 level in UL-94 test for flame resistance at a thickness of 0.8 mm, had an Izod impact strength of 588 j/m (60 kgf-cm/cm) or larger and a deflection temperature under load at 130° C. or higher, and showed an excellent flame resistance, an excellent impact resistance, as well as an excellent heat resistance.

2) As shown in Example 3, even if the type of organic sulfonic acid metal salt was changed, the composition could satisfy the flame resistance level V-0, and showed an excellent impact resistance and an excellent heat resistance.

3) As shown in Examples 4 and 5, even if the amount of the organic sulfonic acid metal salt or the diene-containing multi-layered polymer was changed, the composition could satisfy the flame resistance level V-0, and showed an excellent impact resistance and an excellent heat resistance.

4) As shown in Comparative Example 1, in case that a diene-containing multi-layered polymer was not admixed, the flame resistance level of the composition became V-2, and the composition showed a low flame resistance and a low Izod impact strength.

5) As shown in Comparative Examples 2–4, in case that diene-free multi-layered polymer was admixed, ignition by dropping on cotton occurred in UL-94 test for flame resistance at a thickness of 0.8 mm, and the after flame time was long, giving V-2 or NG.

6) As shown in Comparative Examples 5 and 6, in case that a phosphorus-containing flame-retardant was admixed, impact resistance and heat resistance were lowered.

7) As shown in Example 6, the flame-retardant polycarbonate resin composition according to the present invention did not give "silver streak", showed an excellent impact resistance after retention test, and satisfied the flame resistance level V-0 even after humidification test.

8) As shown in Comparative Examples 7 and 8, in case that a phosphorus-containing flame-retardant was admixed, "silver streak" was generated, and impact resistance was lowered after retention test, and flame resistance was also lowered after humidification test.

The flame-retardant polycarbonate resin composition according to the present invention is a flame-retardant material using phosphorus-free and bromine-free flame-retardant(s). The composition has an excellent impact resistance, an excellent heat resistance as well as an excellent moldability, and satisfies a severe flame resistance level. The composition only rarely causes an environmental pollution, only rarely causes corrosion to mold and screw, and only rarely gives defective appearance such as silver streak after retention in the cylinder of a molding machine, so that the composition has few limitations in molding. In addition, the flame resistance of the composition is not lowered even after humidification test. Therefore, the composition is useful for various usage, in particular for large molded products and thin molded products in the electric and electronic equipment industry and the precision machine industry.

What is claimed is:

1. A flame-retardant polycarbonate resin composition which comprises (A) 100 parts by weight of an aromatic polycarbonate resin, (B) 0.01–5 parts by weight of an organic sulfonic acid metal salt, (C) 0.01–5 parts by weight of a fluorinated polyolefin, (D) 0.2–20 parts by weight of a diene-containing multi-layered polymer which has a core layer consisting mainly of an elastic polymer obtained by polymerizing monomers containing butadiene, and a shell consisting mainly of a polymer obtained by polymerizing methacrylate ester monomers, and wherein the content of a phosphorus-containing flame-retardant is less than 0.5 parts by weight.

2. The flame-retardant polycarbonate resin composition according to claim 1, wherein said aromatic polycarbonate resin (A) is derived from 2,2-bis(4-hydroxyphenyl)propane.

3. The flame-retardant polycarbonate resin composition according to claim 1, wherein said aromatic polycarbonate resin (A) has a viscosity-average molecular weight of 15,000–30,000.

4. The flame-retardant polycarbonate resin composition according to claim 1, wherein said organic sulfonic acid metal salt (B) is a perfluoroalkane-sulfonic acid metal salt.

5. The flame-retardant polycarbonate resin composition according to claim 1, wherein the metal of said organic sulfonic acid metal salt (B) is an alkaline metal or an alkaline earth metal.

6. The flame-retardant polycarbonate resin composition according to claim 1, wherein said fluorinated polyolefin (C) is polytetrafluoroethylene.

7. The flame-retardant polycarbonate resin composition according to claim 6, wherein said polytetrafluoroethylene has an ability of forming fibril.

8. The flame-retardant polycarbonate resin composition according to claim 1, wherein said diene-containing multi-layered polymer (D) has a core layer consisting mainly of an elastic polymer obtained by polymerizing monomers containing butadiene, and an outer layer consisting mainly of a polymer obtained by polymerizing monomers containing methyl methacrylate.

9. The flame-retardant polycarbonate resin composition according to claim 1, wherein said aromatic polycarbonate resin (A) is a polycarbonate resin derived from 2,2-bis(4-hydroxyphenyl)propane, said organic sulfonic acid metal salt (B) is an alkaline metal salt or an alkaline earth metal salt of a perfluoroalkane-sulfonic acid, said fluorinated polyolefin (C) is polytetrafluoroethylene, and said diene-containing multi-layered polymer (D) has a core layer consisting mainly of an elastic polymer obtained by polymerizing monomers containing butadiene, and an outer layer consisting mainly of a polymer obtained by polymerizing monomers containing methyl methacrylate.

10. The flame-retardant polycarbonate resin composition according to claim 1, wherein the content of a phosphorus-containing flame-retardant is 0.3 parts by weight or less per 100 parts by weight of an aromatic polycarbonate resin.

11. The flame-retardant polycarbonate resin composition according to claim 1, wherein the content of a phosphorus-containing flame-retardant is 0.1 parts by weight or less per 100 parts by weight of an aromatic polycarbonate resin.

12. The flame-retardant polycarbonate resin composition according to claim 1, wherein said composition contains substantially no phosphorus-containing flame-retardant.

13. A molded product which is made of a flame-retardant polycarbonate resin composition which comprises (A) 100 parts by weight of an aromatic polycarbonate resin, (B) 0.01–5 parts by weight of an organic sulfonic acid metal salt, (C) 0.01–5 parts by weight of a fluorinated polyolefin, (D) 0.2–20 parts by weight of a diene-containing multi-layered polymer which has a core layer consisting mainly of an elastic polymer obtained by polymerizing monomers containing butadiene, and a shell consisting mainly of a polymer obtained by polymerizing methacrylate ester monomers, and wherein the content of a phosphorus-containing flame-retardant is less than 0.5 parts by weight.

14. The molded product according to claim 13, wherein said composition has an Izod impact strength of 392 j/m (40 kgf-cm/cm) or larger.

15. The molded product according to claim 13, wherein said composition has a deflection temperature under load of 129° C. or higher.

16. The molded product according to claim 13, which satisfies a UL flammability level of V-0 at a thickness of 1 mm or less.

17. A thin molded product having parts with a thickness of 1 mm or less which is made of a flame-retardant polycarbonate resin composition which comprises (A) 100 parts by weight of an aromatic, polycarbonate resin, (B) 0.01–5 parts by weight of an organic sulfonic acid metal salt, (C) 0.01–5 parts by weight of a fluorinated polyolefin, (D) 0.2–20 parts by weight of a diene-containing multi-layered polymer which has a core layer consisting mainly of an elastic polymer obtained by polymerizing monomers containing butadiene, and a shell consisting mainly of a polymer obtained by polymerizing methacrylate ester monomers, and wherein the content of a phosphorus-containing flame-retardant is less than 0.5 parts by weight.

* * * * *

UNITED STATES PATENT AND TRADEMARK OFFICE
CERTIFICATE OF CORRECTION

PATENT NO. : 6,342,550 B1
DATED : January 29, 2002
INVENTOR(S) : Kazuhiko Ishii, Ken Shimomai and Kunitoshi Mimura It is certified that error appears in the above-identified patent and that said Letters Patent is hereby corrected as shown below:

<u>Title page,</u>
Item [75], Inventors: please replace "both" with -- and Kunitoshi Mimura, all --

Signed and Sealed this

Twenty-fourth Day of September, 2002

Attest:

JAMES E. ROGAN
*Attesting Officer*    *Director of the United States Patent and Trademark Office*